United States Patent
Gyllenhammar et al.

(10) Patent No.: US 12,221,120 B2
(45) Date of Patent: Feb. 11, 2025

(54) METHOD AND DEVICE FOR MONITORING OPERATIONS OF AN AUTOMATED DRIVING SYSTEM OF A VEHICLE

(71) Applicant: ZENSEACT AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: ZENSEACT AB, Gothenburg (SE)

( * ) Notice: Subject to any disclaimer, the term of this patent is extended or adjusted under 35 U.S.C. 154(b) by 181 days.

(21) Appl. No.: 17/901,127

(22) Filed: Sep. 1, 2022

(65) Prior Publication Data
US 2023/0071569 A1    Mar. 9, 2023

(30) Foreign Application Priority Data
Sep. 6, 2021    (EP) .................................. 21195114

(51) Int. Cl.
*B60W 50/029*    (2012.01)
*B60W 60/00*    (2020.01)
*B60W 50/00*    (2006.01)

(52) U.S. Cl.
CPC .... *B60W 50/029* (2013.01); *B60W 60/00186* (2020.02); *B60W 2050/0028* (2013.01); *B60W 2050/0292* (2013.01); *B60W 2540/18* (2013.01); *B60W 2556/45* (2020.02)

(58) Field of Classification Search
CPC ................................................. B60W 50/029
See application file for complete search history.

(56) References Cited

U.S. PATENT DOCUMENTS

| | | | | |
|---|---|---|---|---|
| 10,308,260 | B2 * | 6/2019 | Fleck | B60W 50/045 |
| 11,214,268 | B2 * | 1/2022 | Gonzalez Aguirre | G05B 23/024 |
| 11,226,623 | B2 * | 1/2022 | Bowen | G05D 1/0259 |
| 11,702,087 | B2 * | 7/2023 | Zhu | B60W 50/045 701/29.1 |
| 2018/0079425 | A1 | 3/2018 | Fleck et al. | |
| 2020/0319638 | A1 | 10/2020 | Bowen | |

(Continued)

OTHER PUBLICATIONS

Extended European Search Report mailed Mar. 15, 2022 for European Patent Application No. 21195114.0, 8 pages.

*Primary Examiner* — Michael A Berns
(74) *Attorney, Agent, or Firm* — Sage Patent Group

(57) ABSTRACT

The present disclosure describes a method for monitoring operations of an automated driving system (ADS) of a vehicle. For each monitored operation the method includes: determining a geographical position of the vehicle; determining an intended path of the vehicle; and determining one or more intended parameters associated with performing a driving manoeuvre of said vehicle from the determined geographical position along the intended path. For each monitored operation the method further includes: obtaining one or more parameters associated with performing the driving manoeuvre of said vehicle from said determined geographical position; and retrieving, from a statistical model, data indicative of a statistical distribution related to one or more corresponding intended and/or obtained parameters for said intended path. Based on said retrieved data, determining whether there is an anomaly associated with said monitored operation; and taking at least one action of a set of predefined actions if an anomaly is determined.

15 Claims, 4 Drawing Sheets

(56) References Cited

U.S. PATENT DOCUMENTS

| | | |
|---|---|---|
| 2021/0078588 A1 | 3/2021 | Zhu |
| 2022/0105955 A1* | 4/2022 | Shridhar ................ G06V 20/56 |
| 2022/0237414 A1* | 7/2022 | Zhang ................... A01M 21/00 |
| 2022/0396289 A1* | 12/2022 | Li ....................... G01C 21/3407 |
| 2023/0071569 A1* | 3/2023 | Gyllenhammar ........................... B60W 60/00186 |

* cited by examiner

METHOD AND DEVICE FOR MONITORING OPERATIONS OF AN AUTOMATED DRIVING SYSTEM OF A VEHICLE

CROSS-REFERENCE TO RELATED APPLICATIONS

The present application for patent claims priority to European Patent Office Application Ser. No. 21195114.0, entitled "METHOD AND DEVICE FOR MONITORING OPERATIONS OF AN AUTOMATED DRIVING SYSTEM OF A VEHICLE, VEHICLE AND COMPUTER-READABLE STORAGE MEDIUM" filed on Sep. 6, 2021, assigned to the assignee hereof, and expressly incorporated herein by reference.

TECHNICAL FIELD

The present invention relates to a method for monitoring operations of an automated driving system, ADS, of a vehicle. The present invention further relates to a device for monitoring operations of an ADS of a vehicle. The present invention further relates to a vehicle comprising such a device. The present invention also relates to a computer-readable storage medium.

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving.

Today, development is ongoing within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new vehicles being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. It is therefore a need to facilitate improving safety for such ADS-equipped vehicles.

OBJECTS OF THE INVENTION

An object of the present invention is to provide a method, a device, a vehicle and a computer-readable storage medium, which seek to mitigate, alleviate, or eliminate one or more of drawbacks of presently known systems and methods.

An object of the present invention is to provide a method for monitoring operations of an automated driving system, ADS, of a vehicle, which facilitates efficiently and reliably improving safety for such ADS-equipped vehicles.

Another object of the present invention is to provide a device for monitoring operations of an automated driving system, ADS, of a vehicle, which facilitates efficiently and reliably improving safety for such ADS-equipped vehicles.

Another object of the present invention is to provide a vehicle comprising such a device.

Yet another object of the present invention is to provide a computer-readable storage medium.

SUMMARY

These and other objects, apparent from the following description, are achieved by a method, a device, a vehicle, computer-readable storage medium, as set out in the appended independent claims. Preferred embodiments of the method and the device are defined in appended dependent claims.

According to an aspect of the present disclosure there is provided a method for monitoring operations of an automated driving system, ADS, of a vehicle. For each monitored operation the method comprises: determining a geographical position of the vehicle; determining an intended path of the vehicle; and determining one or more intended parameters associated with performing a driving manoeuvre of said vehicle from the determined geographical position along the intended path. For each monitored operation the method further comprises: obtaining one or more parameters associated with performing the driving manoeuvre of said vehicle from said determined geographical position; and retrieving, from a statistical model, data indicative of a statistical distribution related to one or more corresponding intended and/or obtained parameters for said intended path. For each monitored operation the method further comprises: determining, based on said retrieved data, said determined intended path and at least one of the obtained parameters and the determined intended parameters, whether there is an anomaly associated with said monitored operation; and, taking at least one action of a set of predefined actions if an anomaly is determined.

Such a method for monitoring safety operations of an automated driving system, ADS, of a vehicle may be utilized as a complement to other methods in order to further facilitate improving safety. With this method, safety may be efficiently and reliably improved for such ADS-equipped vehicles. By thus determining whether there is an anomaly with such a monitored operation, account is taken how such parameters, e.g., steering angle and/or lane positioning, normally behave in an efficient and reliable way. Thereby the analysis of the performance of the ADS is facilitated.

By thus basing monitoring on such a statistical model, a robust, accurate, reliable and cost efficient method is facilitated. According to an aspect of the method, said monitoring is based on statistical model/models from which location specific data based on actual historical outcome from other vehicles, e.g., vehicles of a fleet, are retrieved, so as to facilitate a robust, accurate, reliable and cost efficient method.

With the thus provided method according to the present disclosure, high degree of actual redundancy is facilitated due to separation between the monitor (i.e. monitoring software) and the monitored software (SW). Thus, a high degree of actual redundancy is facilitated due to monitoring of the operation of the full SW, and according to an aspect also hardware (HW), stack of the ADS by monitoring intended and measured (or otherwise obtained) parameters associated with the maneuvering of the vehicle at a specific location, and to compare these with corresponding parameters derived from a statistical model indicative of the (historical) behavior of other vehicles at those locations. Thus, according to an aspect, the method for monitoring safety operations of an ADS of a vehicle according to the present disclosure is configured to provide monitoring operations of an ADS of a vehicle so as to facilitate a high degree of redundancy by separating the monitor and the monitored feature (SW and/or HW) of the ADS.

With the thus provided method according to the present disclosure, a less complex method is facilitated compared to providing an additional (i.e. separate) system for monitoring, which is developed in an independent way.

By thus utilizing such a statistical model and retrieving, from said statistical model, data indicative of a statistical distribution related to one or more corresponding intended and/or obtained parameters for said intended path, it is taken into account how the SW of such a vehicle normally behaves so that no stipulation of what would be the correct behavior is required in order to determine whether there is an anomaly associated with said monitored operation. Thus, the method according to the present disclosure provides an approach that takes into account how the SW normally behaves, instead of having to stipulate what should be a correct behavior.

Further, the statistical model may be used to find points of interest to facilitate further development of the ADS. For example, if there are locations, where the intended paths exhibit high variance in the behavior, it could indicate that it is a point of interest. It could, due to various reasons, be associated with the ADS having potential problems in achieving consistent performance in this location, i.e. along this intended path, and thus requiring additional effort to ensure consistent user experience.

According to an aspect of said method, said one or more intended and obtained parameters comprises intended and obtained steering angles for the vehicle for said intended path and/or intended and obtained position of said vehicle within a lane of said intended path. By thus utilizing the parameters steering angle and/or lane positioning the monitoring operation for anomaly determination may be efficiently and reliably performed.

According to an aspect of said method, the step of determining whether there is an anomaly comprises: comparing said obtained parameters with said retrieved data associated with corresponding obtained parameters for a corresponding intended path; and determining that there is an anomaly if the difference between compared obtained parameters exceeds a predetermined threshold value. By means of such a comparison, anomaly determination may be efficiently and reliably performed.

According to an aspect of said method, the step of determining whether there is an anomaly comprises: comparing said determined intended parameters with said retrieved data associated with corresponding intended parameters for a corresponding intended path; and determining that there is an anomaly if the difference between compared intended parameters exceeds a predetermined threshold value. By means of such a comparison, anomaly determination may be efficiently and reliably performed.

According to an aspect of said method, the step of determining whether there is an anomaly comprises: comparing said determined intended parameters with said retrieved data associated with corresponding obtained parameters associated with performing the driving manoeuvre for a corresponding intended path; and determining that there is an anomaly if the difference between compared intended parameters and obtained parameters exceeds a predetermined threshold value. By means of such a comparison, anomaly determination may be efficiently and reliably performed. Said obtained parameters associated with performing the driving manoeuvre for a corresponding intended path are according to an aspect measured parameters.

According to an aspect of said method, the step of determining that there is an anomaly if the difference between compared parameters exceeds the predetermined threshold value, comprises categorizing the anomaly based on said comparison. By thus categorizing the anomaly based on said comparison, it is facilitated to take the correct action/actions of said set of predefined actions.

According to an aspect of said method, the step of taking at least one action of said set of predefined actions is performed based on degree of difference in said comparison. Hereby the correct action of said set of predefined actions may be taken, thus facilitating improving safety.

According to an aspect of said method, the step of taking at least one action comprises: generating a control signal indicating anomaly and category of anomaly; and performing, based on category of anomaly, at least one of: a vehicle speed reduction; a hand-over procedure; a minimum risk manoeuvre (MRM); and a selection of a driving policy out of a plurality of driving policies. By thus taking one or more of said actions based on degree of difference in said comparison, safety may be improved.

According to an aspect said method further comprises: storing, during a time period, sensor data obtained from a set of vehicle-mounted sensors; and, if it is determined that there is an anomaly, transmitting said stored sensor data, wherein the transmitted sensor data is from a time period around a point in time when the anomaly was determined. Hereby sensor data obtained from said set of vehicle mounted sensors may be temporary stored, and in connection to a determined anomaly, temporarily stored sensor data around the period of the determination, e.g., a certain time before, during and after the determination, that sensor data is transmitted for facilitating further analysis of the determined anomaly and taken actions associated with that.

According to an aspect said method further comprises: storing, during a time period, ADS data obtained from the ADS of the vehicle; and, if it is determined that there is an anomaly, transmitting said stored ADS data, wherein the transmitted ADS data is from a time period around a point in time when the anomaly was determined. Hereby ADS data obtained from said the ADS of the vehicle may be temporary stored, and in connection to a determined anomaly, temporarily stored ADS data around the period of the determination, e.g., a certain time before, during and after the determination, may be transmitted for facilitating further analysis of the determined anomaly and taken actions associated with that determined anomaly.

According to an aspect of said method, the step of transmitting data comprises transmitting said data to a permanent storage device of the vehicle and/or to a remote entity. Hereby further analysis of the determined anomaly and taken actions associated with that determined anomaly is facilitated.

According to another aspect of the present disclosure there is provided a device for monitoring operations of an automated driving system, ADS, of a vehicle. The device comprises a control circuitry configured to, for each monitored operation: determine a geographical position of the vehicle; determine an intended path of the vehicle; and, determine one or more intended parameters associated with performing a driving manoeuvre of said vehicle from the determined geographical position along the intended path. The control circuitry is further configured to, for each monitored operation: obtain one or more parameters associated with performing the driving manoeuvre of said vehicle from said determined geographical position; and, retrieve, from a statistical model, data indicative of a statistical distribution related to one or more corresponding intended and/or obtained parameters for said intended path. The control circuitry is further configured to, for each monitored operation: determine, based on said retrieved data, said determined intended path and at least one of the obtained parameters and the determined intended parameters, whether there is an anomaly associated with said monitored operation; and, if an anomaly is determined, take at least one action of a set of predefined actions.

According to an aspect of said device, said one or more intended and obtained parameters comprises intended and obtained steering angles for the vehicle for said intended path and/or intended and obtained position of said vehicle within a lane of said intended path.

According to an aspect of said device, the control circuitry, when determining whether there is an anomaly, is configured to: compare said obtained parameters with said retrieved data associated with corresponding obtained parameters for a corresponding intended path; and, determine that there is an anomaly if the difference between compared obtained parameters exceeds a predetermined threshold value.

According to an aspect of said device, the control circuitry, when determining whether there is an anomaly, is configured to: compare said determined intended parameters with said retrieved data associated with corresponding intended parameters for a corresponding intended path; and, determine that there is an anomaly if the difference between compared intended parameters exceeds a predetermined threshold value.

According to an aspect of said device, the control circuitry, when determining whether there is an anomaly, is configured to: compare said determined intended parameters with said retrieved data associated with corresponding obtained, e.g., measured, parameters associated with performing the driving manoeuvre for a corresponding intended path; and, determine that there is an anomaly if the difference between compared intended parameters and obtained parameters exceeds a predetermined threshold value.

According to an aspect of said device, the control circuitry, when determining that there is an anomaly if the difference between compared parameters exceeds a predetermined threshold value, is configured to categorize the anomaly based on said comparison.

According to an aspect of said device, the control circuitry, when taking at least one action of said set of predefined actions, is configured to perform said at least one action based on degree of difference in said comparison.

According to an aspect of said device, the control circuitry, when taking at least one action, is configured to: generate a control signal indicating anomaly and category of anomaly; and, perform, based on category of anomaly, at least one of: a vehicle speed reduction; a hand-over procedure; a minimum risk manoeuvre; and, a selection of a driving policy out of a plurality of driving policies.

According to an aspect of said device, said control circuitry is further configured to: store, during a time period, sensor data obtained from a set of vehicle-mounted sensors; and, if it is determined that there is an anomaly, transmit said stored sensor data, wherein the transmitted sensor data is from a time period around a point in time when the anomaly was determined.

According to an aspect of said device, said control circuitry is further configured to: store, during a time period, ADS data obtained from the ADS of the vehicle; and, if it is determined that there is an anomaly, transmit said stored ADS data, wherein the transmitted ADS data is from a time period around a point in time when the anomaly was determined.

According to an aspect of said device, the control circuitry, when transmitting the sensor data, is configured to transmit said sensor data to a permanent storage device of the vehicle and/or to a remote entity.

According to an aspect of said device, the control circuitry, when transmitting the ADS data, is configured to transmit said ADS data to a permanent storage device of the vehicle and/or to a remote entity.

The device for monitoring operations of an automated driving system, ADS, of a vehicle according to the present disclosure has the advantages according to the corresponding method as set out herein.

According to another aspect of the present disclosure there is provided a vehicle comprising: an Automated Driving System, ADS, configured to plan and execute the planned paths by performing one or more driving manoeuvres along the intended path; a localization system configured to monitor a geographical position of the vehicle; a perception system comprising at least one sensor configured to monitor a surrounding environment of the vehicle; and a device as set out herein.

According to yet another aspect of the present disclosure there is provided a computer-readable storage medium storing one or more programs configured to be executed by one or more processors of a vehicle control system, the one or more programs comprising instructions for performing the method as set out herein.

It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
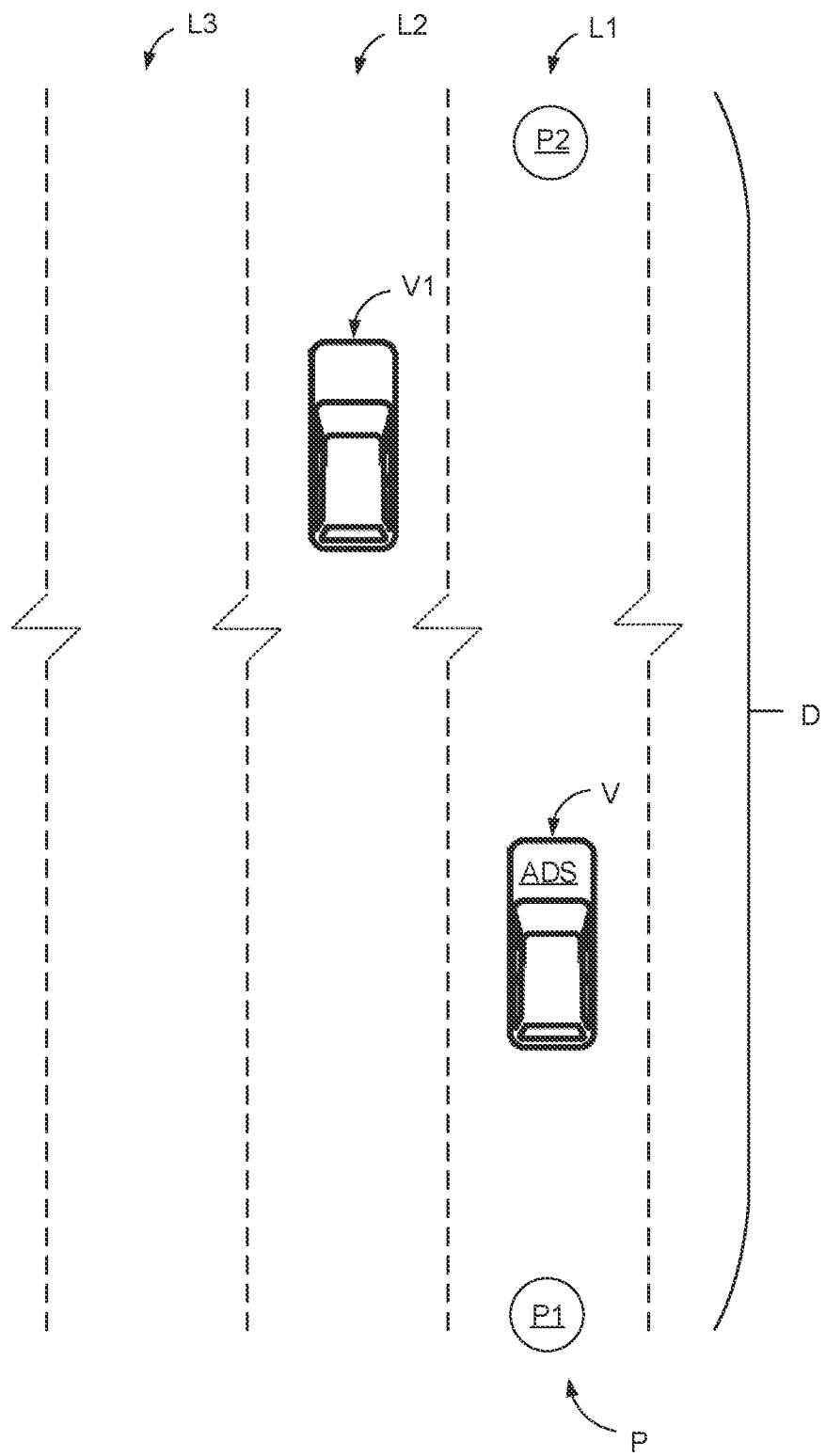
FIG. 1 is a schematic top view illustration of a vehicle performing a driving manoeuvre along an intended path in relation to embodiments of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

The full software (SW) stack of an ADS may be considered as a complex mechanism. The application SW contains a multitude of components including several highly non-linear components such as filters and neural networks. In addition, the application SW is running on top of the platform base SW and hardware (HW), each of which may exhibit different types of errors and faults that may result in unwanted behaviour and failures. Stated differently, when unwanted and unexpected failures occur there is a vast number of potential error sources ranging from bad timing, electrical faults, bit flips, unexpected code behaviour, unexpected sensing performance deviations, unexpected environmental conditions, etc. Thus, it is desirable to be able to provide a system that performs safely, with the aforementioned conditions in mind, and not exposing anyone (occupants or other road users) to unreasonable risk.

In other words, it is desirable to have a simple, but powerful methods to supervise the output of the full SW stacks of an ADS that are capable of potentially catching previously undetected internal deficiencies/errors/problems in the nearly infinite space of discrete states that the system has.

Accordingly, the present inventors realized that a way to monitor the operation of the full SW and HW stack of the ADS is to monitor intended and measured (or otherwise obtained) parameters associated with the maneuvering of the vehicle at a specific location, and to compare these with corresponding parameters derived from a statistical model indicative of the (historical) behaviour of other vehicles at those locations. Thereby, one is able to determine whether there is any unusual or otherwise deviating decisions being taken by the ADS, which may be used as an indication of the performance of the ADS.

For example, assuming that the monitored parameter is a steering angle, and that there is a situation where the ADS of a vehicle decides to instruct the vehicle's control system to apply a steering angle of 4 degrees. Then, by comparing with the statistical model indicative of the behaviour of other corresponding vehicles at the same location (and with the same path intention, e.g., stay in the right-most lane) one may conclude that a steering angle of 4 degrees for that "intended path" is unusual behaviour since the statistical model indicates that the most common operation is a steering angle of −2 degrees. This conclusion, i.e., that the ADS's decision is a statistical "anomaly", can effectively be used to identify potential safety-critical errors somewhere in the ADS SW/HW stack, or to identify "scenarios" (i.e., edge cases) that are of interest for development purposes.

Thus, if the intended or measured (or otherwise obtained) steering angle deviates too much (above a threshold) from the "norm", one or possibly a plurality of "things" are not as the ADS expects them to be. Since the general object for any unsupervised vehicle is to be in "control" of any given situation, it is undesirable to have situations when the ADS appears unsure about the current state of the vehicle or of the surrounding environment.

Moreover, by using statistical models (preferably compiled from data obtained from a relatively homogenous fleet of vehicles) one does not need to stipulate what "correct" behaviour is in every situation. Instead, the "correct" behaviour is defined through statistical inference of how other vehicles, having the same "path intention", have performed the corresponding tasks successfully at specific locations. Moreover, the utilization of statistical models further adds the benefit of having a dynamic reference frame, which adapts to real-world changes.

It also opens up for further analysis of the statistical model. For example, if there are locations with high variance in ADS behaviour, it could be used as an indication that it is a point of interest. It could, due to various reasons, potentially be the ADS that has problems in achieving consistent performance in this location, wherefore one could take the appropriate measures (e.g., SW update) to ensure a more consistent user experience.

Herein the term "monitoring operations of an automated driving system, ADS, of a vehicle" may comprise and/or refer to monitoring the ADS/performance of the ADS/operation of the ADS, which may comprise interpreting information, processing data/information and generating output for execution by the (vehicle/ADS) platform".

Herein the term "obtaining", in connection to e.g., "obtaining one or more parameters associated with performing a driving manoeuvre of a vehicle from a determined geographical position" may refer to terms comprising "acquiring", "retrieving", "receiving", "determining", "measuring", "detecting", "collecting", "observing".

Herein the term "intended path", may be any suitable path for a vehicle with an automated driving system, ADS. The term "intended path", may be understood as an indication of how the ADS is going to control the movement of the vehicle relative to a road geometry over a certain stretch of road, said stretch having any suitable distance and any suitable extension, where the road geometry may have one or more lanes.

Herein the term "steering angle", may refer to any angle associated with steering the vehicle in connection to maneuvering the vehicle along an intended path according to the present disclosure. The term "steering angle", may refer to the steering wheel angle of the steering wheel of the vehicle. The term "steering angle", may refer to the angle of the ground engaging wheels of the vehicle relative to the longitudinal extension of the vehicle. The term "steering angle", may refer to the angle of portions such as shafts/axles comprised in a mechanical arrangement connected to and arranged for steering the ground engaging steerable wheels of the vehicle relative to the longitudinal extension of the vehicle.

For the method and device for monitoring operations of an automated driving system (ADS) of a vehicle according to the present disclosure, a statistical model is utilized from which data is retrieved, indicative of a statistical distribution related to one or more intended and/or obtained parameters for an intended path corresponding to intended and obtained, e.g., measured, parameters associated with performing a driving manoeuvre of a vehicle from a determined geographical position along that intended path. According to an aspect of the present disclosure, said one or more intended and obtained parameters comprises intended and obtained steering angles for the vehicle for said intended path and/or intended and obtained position of said vehicle within a lane of said intended path.

Thus, for different specific paths/intended paths, such statistical models have according to an aspect of the present disclosure been obtained by means of collecting, from selected vehicles, one or more intended and obtained parameters associated with performing a driving manoeuvre of a vehicle from a determined geographical position along the intended path. Said selected vehicles may be from a fleet of vehicles having at least similar properties related to said one or more parameters associated with performing the driving manoeuvre of the vehicle from the determined geographical position along the intended path. Such statistical models obtained for different specific paths/intended paths are thus location specific, i.e., associated with specific paths/intended paths.

Such a statistical model, from which data indicative of a statistical distribution related to one or more intended and/or obtained parameters for an intended path is retrievable, is according to an aspect of the present disclosure configured to be arranged in an ADS-provided vehicle configured to perform a driving manoeuvre from a determined geographical position along the intended path.

Such a statistical model, from which data indicative of a statistical distribution related to one or more intended and/or obtained parameters for an intended path is retrievable, is according to an aspect of the present disclosure configured to be remotely operably connectable to an ADS-provided vehicle configured to perform a driving manoeuvre from a determined geographical position along the intended path.

Thus, such a statistical model according to the present disclosure may be arranged in or be remotely operably connectable to an ADS-provided vehicle. According to an aspect of the present disclosure, the statistical model according to the present disclosure is locally stored in a suitable memory device of the vehicle.

Herein the term "statistical model", may be understood as a description of what are statistically reasonable parameter values across the intended path. In particular, the statistical model may indicate of how the ADSs of other vehicles in the fleet of vehicles, and where applicable non-ADS vehicles configured to facilitate providing relevant information/parameters, have executed paths in specific geographical areas in the past, in terms of intended and obtained (e.g., measured) parameters associated with the path execution manoeuvres.

In more detail, in connection to monitoring operations of an ADS of a vehicle, the statistical model comprises data indicative of a statistical distribution related to one or more intended and/or obtained parameters for an intended path along which said vehicle is configured to perform a driving manoeuvre. According to an aspect of the present disclosure, a set of data associated with parameters, e.g., steering angle and/or lane positioning, for performing a driving manoeuvre along a certain path has been modelled by means of different segmentation and quantification methods. Thus, a statistical model may be understood as a mathematical representation of a statistical distribution. In more detail, the statistical model of one or more parameters for performing a driving manoeuvre along a certain path quantifies what the ADS can expect from such an operation in a statistical way.

FIG. 1 is a schematic top view illustration of a vehicle V performing a driving manoeuvre along an intended path P in relation to embodiments of the present disclosure. The intended path P in the exemplary embodiment is a stretch of a lane L1 of a road R. The road in this example has three lanes L1, L2, L3, a first lane L1 along which the vehicle V is travelling, a second lane along which another vehicle V1 is travelling and a third lane L3. The intended path P has a starting position P1 and an end position P2. The intended path P has a distance D. The vehicle V is equipped with an automated driving system, ADS. The intended path P is thus a certain stretch of a certain road R, said stretch having a certain distance D and certain extension (e.g., straight, curved, etc.) The operation of the ADS of the vehicle is configured to be monitored by means of a device for monitoring operations of an ADS of a vehicle, see e.g., FIG. 4.

Figure 4:
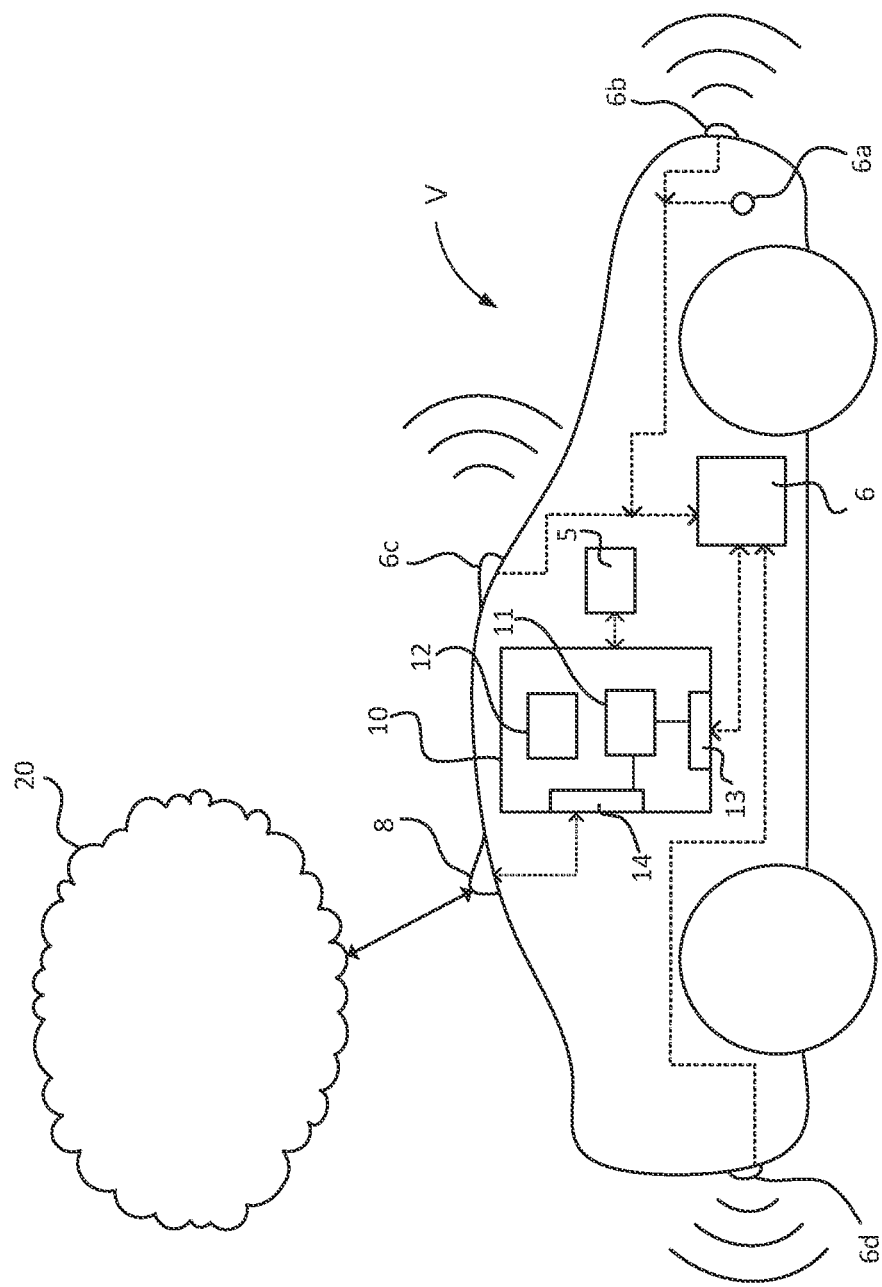
FIG. 4 is a schematic side view illustration of a vehicle comprising a device in accordance with some embodiments of the present disclosure.

When the vehicle V was located at the starting position P1, that geographical position was determined by means of a control circuitry of the device of the vehicle, see e.g., FIG. 4. The geographical position, here the starting position P1, may be determined by means of the control circuitry in any suitable way, e.g., by means of a GNSS arrangement (e.g., GPS, GLONASS, BeiDou, Galileo, or any other regional variant thereof) of the vehicle together with map data, which may be comprised in said device or operably connectable to said device.

The intended path was also determined/obtained by means of said control circuitry of the device of the vehicle. The intended path may be determined by means of the control circuitry in any suitable way, e.g., by means of a path planning system/feature/function of the ADS, a GNSS-arrangement of the vehicle, and map data, which may be comprised in said device or operably connectable to said device.

When or prior to the vehicle V was located at the starting position P1 for performing driving manoeuvre along the intended path P, one or more intended parameters, e.g., steering angle and/or lane positioning, associated with performing the driving manoeuvre of said vehicle from the determined geographical position P1 along the intended path are determined. The one or more intended parameters, e.g., steering angle and/or lane positioning, may be determined by means of the control circuitry in any suitable way, e.g., by deriving the intended parameters from the determined intended path. However, the intended parameters may be retrieved or received from a path planning module/feature of the ADS. In more detail, the ADS may comprise a "path planner", i.e., a path planning module that is configured to generate candidate paths for execution by a control module of the ADS platform, based on various input data (sensor data, map data, localization data, goal position, and so forth) as readily understood by the skilled person in the art.

When performing the driving manoeuvre along the intended path, one or more obtained parameters, e.g., steering angle and/or lane positioning, associated with performing the driving manoeuvre of said vehicle from the determined geographical position along the intended path are determined. The one or more intended parameters, e.g., steering angle and/or lane positioning, may be obtained by means of the control circuitry in any suitable way, e.g., by measuring said parameters, e.g., steering angle and/or lane positioning, by means of one or more vehicle-mounted sensors. Thus, the control circuitry may be configured to retrieve sensor data from the one or more vehicle-mounted sensor in order to obtain the one or more parameters associated with performing the driving manoeuvre of said vehicle from said determined geographical position.

Further, data indicative of a statistical distribution related to one or more corresponding intended and/or obtained parameters for said intended path are retrieved from a statistical model. The one or more corresponding intended and/or obtained parameters, e.g., steering angle and/or lane positioning, may be retrieved by means of the control circuitry from a suitable local or remote data repository. According to an aspect of the present disclosure, the one or more corresponding intended and/or obtained parameters, e.g., steering angle and/or lane positioning, may have been retrieved from said statistical model prior to performing said driving manoeuvre along the intended path. According to an alternative aspect of the present disclosure, the one or more corresponding intended and/or obtained parameters, e.g., steering angle and/or lane positioning, may be retrieved from said statistical model when performing said driving manoeuvre along the intended path.

Furthermore, for each monitored operation of the vehicle, it may be determined, by means of the control circuitry, based on said retrieved data, said determined intended path and at least one of the obtained parameters and the determined intended parameters, whether there is an anomaly associated with said monitored operation, and if so, take at least one action of a set of predefined actions. Said at least one action may depend on category of anomaly and may comprise performing a vehicle speed reduction; a hand-over procedure; a minimum risk manoeuvre; and/or, a selection of a driving policy out of a plurality of driving policies.

Such a vehicle V is explained in more detail below with reference to FIG. 4.

Figure 2:
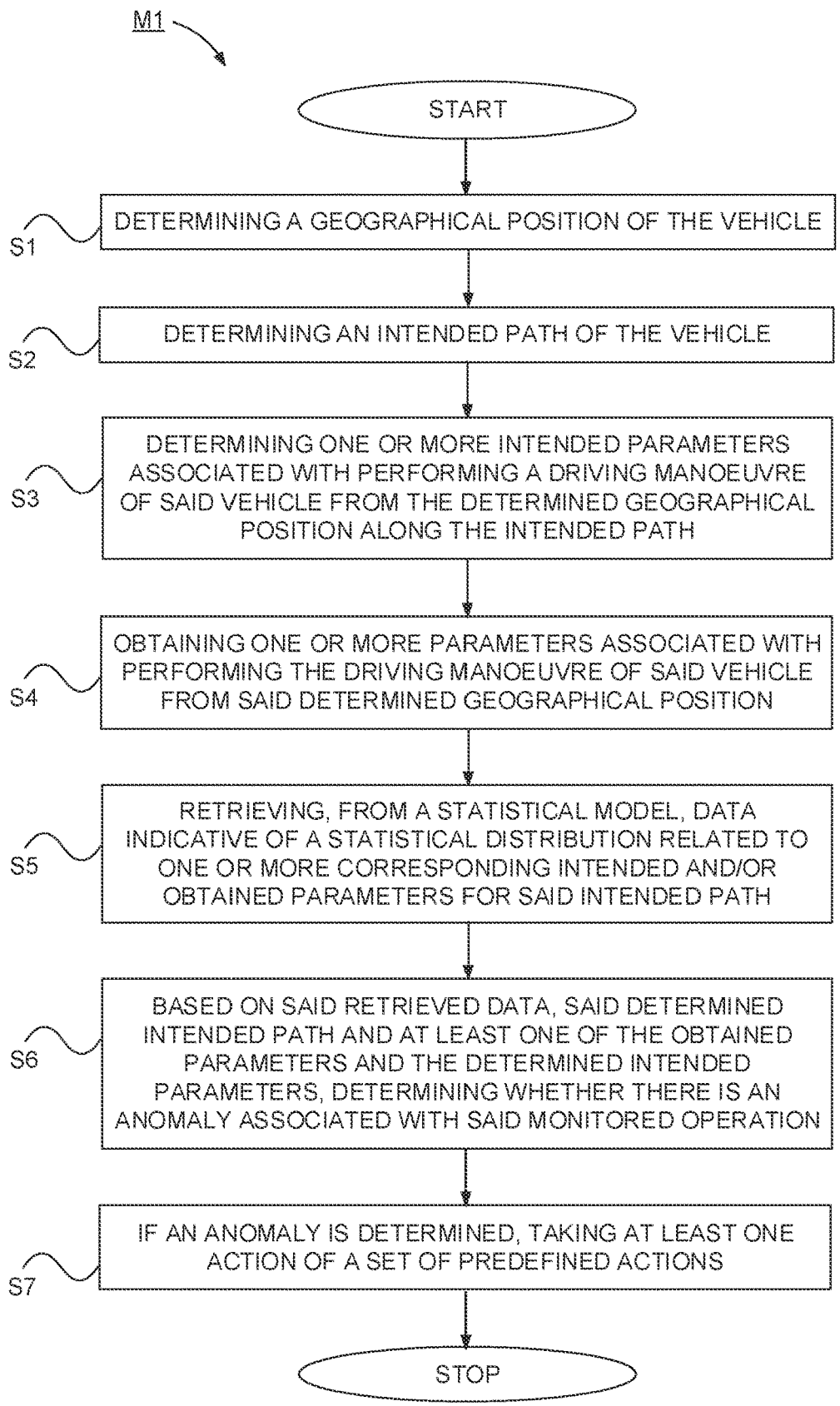
FIG. 2 is a flow-chart representation of a method for monitoring operations of an automated driving system, ADS, of a vehicle in accordance with some embodiments of the present disclosure.

FIG. 2 is a flow-chart representation of a method M1 for monitoring operations of an automated driving system, ADS, of a vehicle in accordance with an embodiment of the present disclosure. According to an aspect of the present disclosure, the method M1 comprises a number of steps configured to be performed for each monitored operation.

According to the aspect the method M1 comprises a step S1. In this step, a geographical position of the vehicle is determined.

According to the aspect the method M1 comprises a step S2. In this step, an intended path of the vehicle is determined.

According to the aspect the method M1 comprises a step S3. In this step, one or more intended parameters associated with performing a driving manoeuvre of said vehicle from the determined geographical position along the intended path is/are determined. According to an aspect of said method, said one or more intended and obtained parameters comprises intended and obtained steering angles for the vehicle for said intended path. According to an aspect of said method, said one or more intended and obtained parameters comprises intended and obtained positions of said vehicle within a lane of said intended path.

According to the aspect the method M1 comprises a step S4. In this step, one or more parameters associated with performing the driving manoeuvre of said vehicle from said determined geographical position are obtained.

According to the aspect the method M1 comprises a step S5. In this step, from a statistical model, data indicative of a statistical distribution related to one or more corresponding intended and/or obtained parameters for said intended path are retrieved.

According to the aspect the method M1 comprises a step S6. In this step, it is determined, based on said retrieved data, said determined intended path and at least one of the obtained parameters and the determined intended parameters, whether there is an anomaly associated with said monitored operation.

According to the aspect the method M1 comprises a step S7. In this step, if an anomaly is determined, at least one action of a set of predefined actions is taken.

The method M1 for monitoring operations of an ADS of a vehicle is according to an embodiment adapted to be performed by the device described below with reference to FIG. 4.

The method M1 for monitoring operations of an ADS of a vehicle is according to an embodiment adapted to be performed by a computer program comprising computer-readable instructions which, when executed by at least one processor of a device for monitoring operations of an automated driving system, ADS, of a vehicle, causes the at least one processor to perform said method M1.

Figure 3:
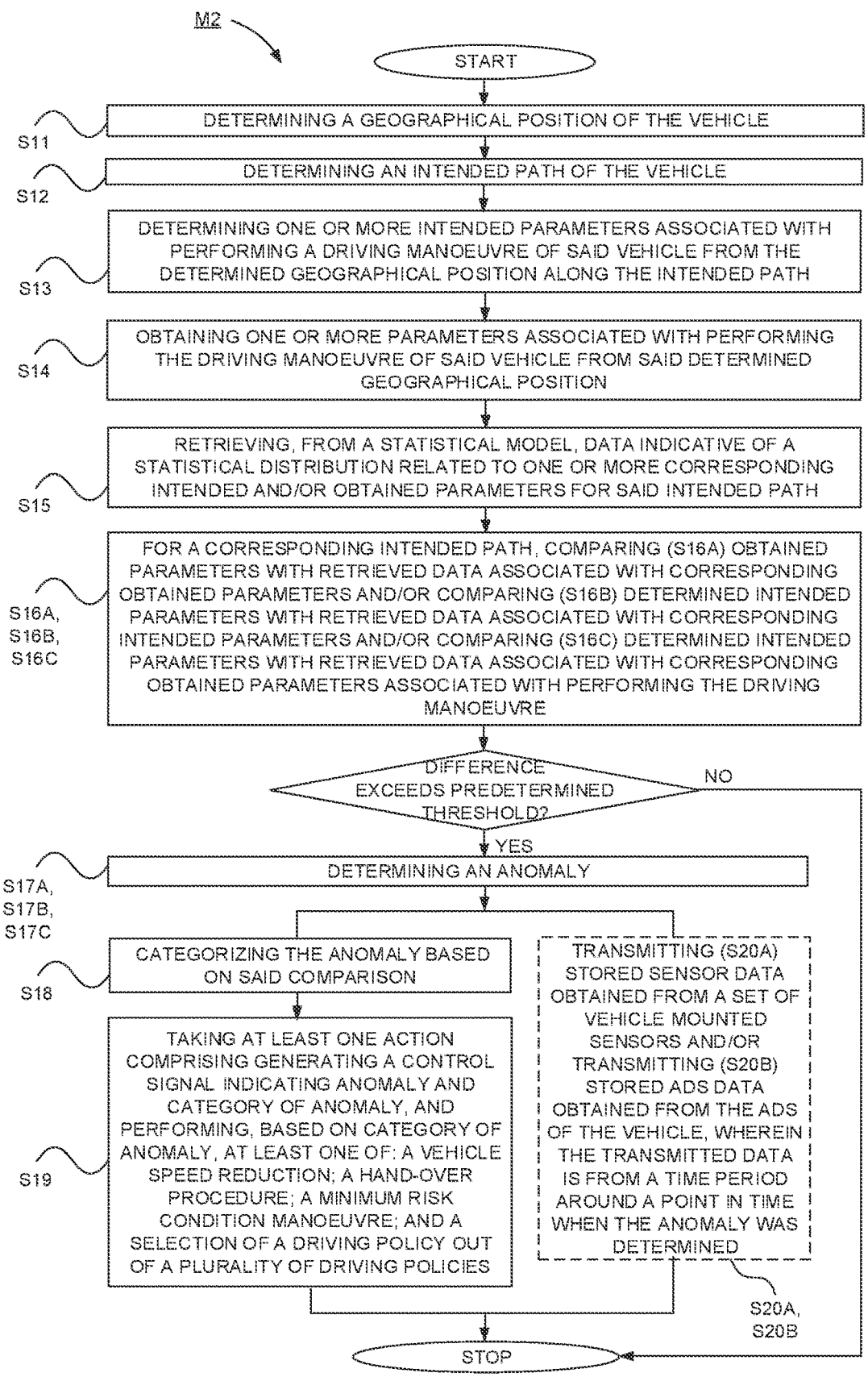
FIG. 3 is a flow-chart representation of a method for monitoring operations of an automated driving system, ADS, of a vehicle in accordance with some embodiments of the present disclosure.

FIG. 3 is a flow-chart representation of a method M2 for monitoring operations of an automated driving system, ADS, of a vehicle in accordance with an embodiment of the present disclosure. According to an aspect of the present disclosure, the method M2 comprises a number of steps configured to be performed for each monitored operation. According to an aspect of the present disclosure, the method M2 is a more specified embodiment of the method M1 described above with reference to FIG. 2. According to an aspect of the present disclosure, the steps S11, S12, S13, S14 and S15 described below, essentially correspond to the steps S1, S2, S3, S4, S5 described above for the method M1 with reference to FIG. 2.

According to the aspect the method M2 comprises a step S11. In this step, a geographical position of the vehicle is determined.

According to the aspect the method M2 comprises a step S12. In this step, an intended path of the vehicle is determined.

According to the aspect the method M2 comprises a step S13. In this step, one or more intended parameters associated with performing a driving manoeuvre of said vehicle from the determined geographical position along the intended path is/are determined. According to an aspect of said method, said one or more intended and obtained parameters comprises intended and obtained steering angles for the vehicle for said intended path. According to an aspect of said method, said one or more intended and obtained parameters comprises intended and obtained positions of said vehicle within one or more lanes of said intended path.

According to the aspect the method M2 comprises a step S14. In this step, one or more parameters associated with performing the driving manoeuvre of said vehicle from said determined geographical position are obtained.

According to the aspect the method M2 comprises a step S15. In this step, from a statistical model, data indicative of a statistical distribution related to one or more corresponding intended and/or obtained parameters for said intended path are retrieved.

According to the aspect the method M2 comprises a step S16A. In this step, said obtained parameters are compared with said retrieved data associated with corresponding obtained parameters for a corresponding intended path.

According to the aspect the method M2 comprises a step S17A. In this step, it is determined that there is an anomaly if the difference between compared obtained parameters exceeds a predetermined threshold value.

According to the aspect the method M2 comprises a step S16B. In this step, said determined intended parameters are compared with said retrieved data associated with corresponding intended parameters for a corresponding intended path.

According to the aspect the method M2 comprises a step S17B. In this step, it is determined that there is an anomaly if the difference between compared intended parameters exceeds a predetermined threshold value.

According to the aspect the method M2 comprises a step S16C. In this step, said determined intended parameters are compared with said retrieved data associated with corresponding obtained, e.g., measured, parameters associated with performing the driving manoeuvre for a corresponding intended path.

According to the aspect the method M2 comprises a step S17C. In this step, it is determined that there is an anomaly if the difference between compared intended parameters and obtained parameters exceeds a predetermined threshold value.

The method M2 may be configured to perform steps S16A, S17A and/or steps S16B, S17B and/or steps S16C, S17C.

According to an aspect of the present disclosure, the method M2 is configured to determine that there is no anomaly if the difference between said compared parameters does not exceed a predetermined value.

According to the aspect the method M2 comprises a step S18. In this step, when it is determined that there is an anomaly due to the difference between compared parameters exceeding a predetermined threshold value, the anomaly is categorized based on said comparison.

According to the aspect the method M2 comprises a step S19. In this step, at least one action is taken, comprising generating a control signal indicating anomaly and category of anomaly; and performing, based on category of anomaly, at least one of: a vehicle speed reduction; a hand-over procedure; a minimum risk manoeuvre; and a selection of a driving policy out of a plurality of driving policies.

According to the aspect the present disclosure, the method M2 comprises a step S20A. In this step, sensor data obtained from a set of vehicle mounted sensors stored during a time period is transmitted if it is determined that there is an anomaly, wherein the transmitted sensor data is from a time period around a point in time when the anomaly was determined.

According to the aspect the present disclosure, the method M2 comprises storing, during a time period, sensor data obtained from a set of vehicle-mounted sensors.

According to the aspect the present disclosure, the method M2 comprises a step S20B. In this step, ADS data obtained from the ADS of the vehicle stored during a time period is transmitted if it is determined that there is an anomaly, wherein the transmitted ADS data is from a time period around a point in time when the anomaly was determined.

According to the aspect the present disclosure, the method M2 comprises storing, during a time period, ADS data obtained from the ADS of the vehicle.

The method M2 for monitoring operations of an ADS of a vehicle is according to an embodiment adapted to be performed by the device described below with reference to FIG. 4.

The method M2 for monitoring operations of an ADS of a vehicle is according to an embodiment adapted to be performed by a computer program comprising computer-readable instructions which, when executed by at least one processor of a device for monitoring operations of an automated driving system, ADS, of a vehicle, causes the at least one processor to perform said method M2.

FIG. 4 is a schematic side view illustration of a vehicle V in accordance with an embodiment of the present disclosure.

The vehicle V comprises a perception system 6 and a localization system 5. A perception system 6 is in the present context to be understood as a system responsible for acquiring raw sensor data from on sensors 6a, 6b, 6c, 6d such as cameras, LIDARs and RADARs, ultrasonic sensors, and converting this raw data into scene understanding. In particular, the vehicle V has at least one vehicle-mounted camera 6c for capturing images of at least a portion of a surrounding environment of the vehicle. The localization system 5 is configured to monitor a geographical position and heading of the vehicle and may in the form of a Global Navigation Satellite System (GNSS), such as a GPS. However, the localization system may alternatively be realized as a Real Time Kinematics (RTK) GPS in order to improve accuracy. Moreover, in the present context the vehicle V is assumed to have access to a digital map, e.g., a HD-map, either in the form of a locally stored digital map or via a remote data repository accessible via an external communication network 20, e.g., as a data stream. In some embodiments, the access to the digital map may for example be provided by the localization system 5. The vehicle V may comprise an antenna 8 for facilitating the connection to the external communication network 20.

Further, the vehicle V may be connected to external network(s) 20 via for instance a wireless link, e.g., for retrieving map data. The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g., IEEE 802.11 based solutions. ETSI is working on cellular standards for vehicle communication and for instance 5G is considered as a suitable solution due to the low latency and efficient handling of high bandwidths and communication channels.

Said vehicle V comprises a device 10 for monitoring operations of an automated driving system, ADS, of said vehicle V.

The device 10 comprises a control circuitry 11. Said control circuitry 11 comprises or is constituted by one or more processors. The control circuitry 11 may be also be referred to as a control circuit 11, control unit 11, or controller 11.

The device 10 further comprises a memory 12, a sensor interface 13 and a communication interface 14. The device 10 preferably comprises a number of software/hardware modules here generalized as "control circuitry" 11. The control circuitry 11 is configured to execute instructions stored in the memory 12 to perform a method for monitoring operations of an automated driving system, ADS, of a vehicle V according to any one of the embodiments disclosed herein. Stated differently, the memory 12 of the device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to, for each monitored operation: determine a geographical position of the vehicle V; determine an intended path of the vehicle V; and, determine one or more intended parameters associated with performing a driving manoeuvre of said vehicle V from the determined geographical position along the intended path. The control circuitry 11 is further configured to, for each monitored operation: obtain one or more parameters associated with performing the driving manoeuvre of said vehicle V from said determined geographical position; and, retrieve, from a statistical model, data indicative of a statistical distribution related to one or more corresponding intended and/or obtained parameters for said intended path. The control circuitry 11 is further configured to, for each monitored operation: determine, based on said retrieved data, said determined intended path and at least one of the obtained parameters and the determined intended parameters, whether there is an anomaly associated with said monitored operation; and, if an anomaly is determined, take at least one action of a set of predefined actions.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals but, are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The control circuitry 11, e.g., processor(s) 11, associated with the device 10 for monitoring operations of the ADS of the vehicle V, may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the control circuitry 11, e.g., via a circuit or any other wired, wireless, or network connection, and includes computer code for executing one or more processes described herein.

It should be appreciated that the communication interface 14 may also provide the possibility to acquire sensor data directly or via dedicated sensor control circuitry in the vehicle. The communication/antenna interface 14 may further provide the possibility to send output to a remote location, e.g., remote operator or control centre, by means of the antenna 8. Moreover, some sensors in the vehicle may communicate with the device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compare the sensor data (movement of the other vehicle) with the predefined behaviour model. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method for monitoring operations of an automated driving system (ADS) of a vehicle, the method comprising, for each monitored operation:
    determining a geographical position of the vehicle;
    determining an intended path of the vehicle;
    determining one or more intended parameters associated with performing a driving manoeuvre of said vehicle from the determined geographical position along said determined intended path;
    obtaining one or more parameters associated with performing the driving manoeuvre of said vehicle from said determined geographical position;
    retrieving, from a statistical model, data indicative of a statistical distribution related to one or more corresponding intended and/or obtained parameters for said determined intended path;
    based on said retrieved data, said determined intended path and at least one of the obtained parameters and the determined intended parameters, determining whether there is an anomaly associated with said monitored operation; and
    responsive to an anomaly being determined, controlling the vehicle to move by performing at least one action of a set of predefined actions.

2. The method according to claim 1, wherein said one or more intended and obtained parameters comprises intended and obtained steering angles for the vehicle for said determined intended path and/or intended and obtained position of said vehicle within a lane of said determined intended path.

3. The method according to claim 1, wherein determining whether there is an anomaly comprises:
    comparing said obtained parameters with said retrieved data associated with corresponding obtained parameters for a corresponding intended path; and
    determining that there is an anomaly if difference between compared obtained parameters exceeds a predetermined threshold value.

4. The method according to claim 1, wherein determining whether there is an anomaly comprises:
    comparing said determined intended parameters with said retrieved data associated with corresponding intended parameters for a corresponding intended path; and
    determining that there is an anomaly if difference between compared intended parameters exceeds a predetermined threshold value.

5. The method according to claim 1, wherein determining whether there is an anomaly comprises:
    comparing said determined intended parameters with said retrieved data associated with corresponding obtained parameters associated with performing the driving manoeuvre for a corresponding intended path; and
    determining that there is an anomaly if difference between compared intended parameters and obtained parameters exceeds a predetermined threshold value.

6. The method according to claim 5, wherein determining that there is an anomaly if the difference between compared parameters exceeds the predetermined threshold value, comprises categorizing the anomaly based on said comparison.

7. The method according to claim 6, wherein the at least one action of said set of predefined actions is performed based on degree of difference in said comparison.

8. The method according to claim 1, wherein controlling the vehicle to move by performing at least one action comprises:
    generating a control signal indicating anomaly and category of anomaly; and
    performing, based on category of anomaly, at least one of:
        a vehicle speed reduction;
        a hand-over procedure;
        a minimum risk manoeuvre; and
        a selection of a driving policy out of a plurality of driving policies.

9. The method according to claim 1, further comprising:
    storing, during a time period, sensor data obtained from a set of vehicle-mounted sensors; and
    if it is determined that there is an anomaly, transmitting said stored sensor data, wherein the transmitted sensor data is from a time period comprising a set time before and after the anomaly was determined.

10. The method according to claim 9, wherein transmitting said stored sensor data comprises transmitting said stored sensor data to a memory of the vehicle and/or to a remote entity.

11. The method according to claim 1, further comprising:
    storing, during a time period, ADS data obtained from the ADS of the vehicle; and
    if it is determined that there is an anomaly, transmitting said stored ADS data, wherein the transmitted ADS data is from a time period comprising a set time before and after the anomaly was determined.

12. A device for monitoring operations of an automated driving system (ADS) of a vehicle, the device comprising control circuitry configured to, for each monitored operation:
    determine a geographical position of the vehicle;
    determine an intended path of the vehicle;
    determine one or more intended parameters associated with performing a driving manoeuvre of said vehicle from the determined geographical position along said determined intended path;
    obtain one or more parameters associated with performing the driving manoeuvre of said vehicle from said determined geographical position;
    retrieve, from a statistical model, data indicative of a statistical distribution related to one or more corresponding intended and/or obtained parameters for said determined intended path; based on said retrieved data, said determined intended path and at least one of the obtained parameters and the determined intended parameters, determine whether there is an anomaly associated with said monitored operation; and
    if an anomaly is determined, control the vehicle to move by performing at least one action of a set of predefined actions.

13. The device according to claim 12, wherein said one or more intended and obtained parameters comprises intended and obtained steering angles for the vehicle for said determined intended path and/or intended and obtained position of said vehicle within a lane of said determined intended path.

14. A vehicle comprising:
    an Automated Driving System (ADS) configured to plan and execute paths by performing one or more driving manoeuvres;
    a localization system configured to monitor a geographical position of the vehicle;
    at least one sensor configured to monitor a surrounding environment of the vehicle; and
    a device according to claim 12.

15. A non-transitory computer-readable storage medium storing one or more programs configured to be executed by one or more processors of a vehicle control system, the one or more programs comprising instructions for performing the method according to claim 1.

* * * * *